Nov. 9, 1965  J. W. JACOBS  3,216,849
METHOD OF MANUFACTURE OF CELLULAR FOAM
Filed April 4, 1963
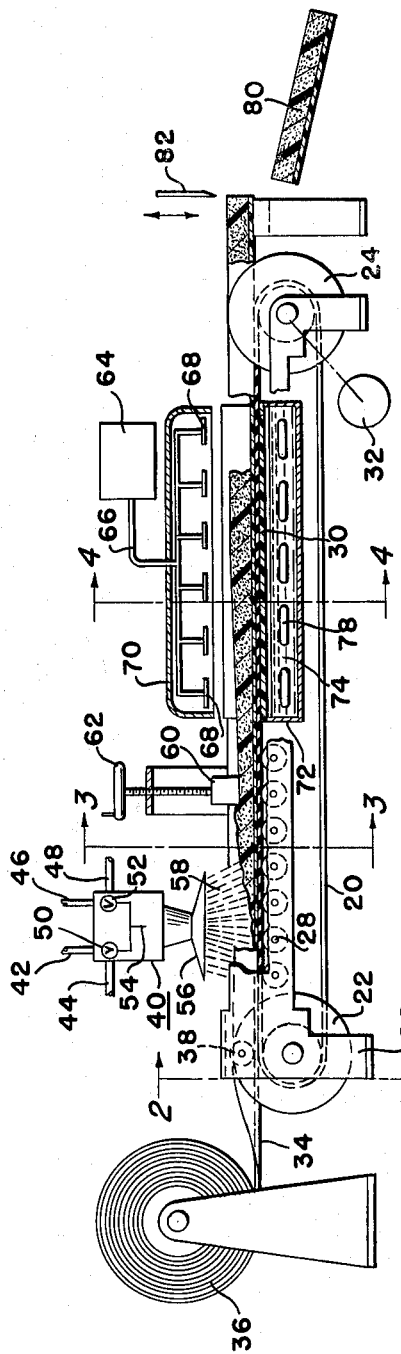
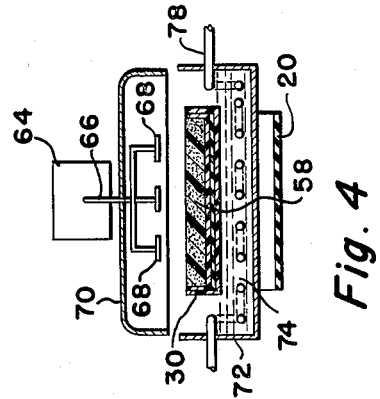
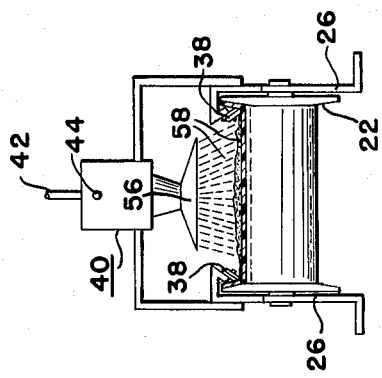
INVENTOR.
James W. Jacobs
BY
His Attorney

United States Patent Office 3,216,849
Patented Nov. 9, 1965

3,216,849
METHOD OF MANUFACTURE OF CELLULAR FOAM
James W. Jacobs, Dayton, Ohio, assignor to General Motors Corporation, Detroit, Mich., a corporation of Delaware
Filed Apr. 4, 1963, Ser. No. 270,588
2 Claims. (Cl. 117—93.31)

This invention pertains to a method of manufacture and more particularly to a method of and apparatus for continuously manufacturing uniform cellular foam material.

It has been recognized that cellular foam materials are strong compared to their weight and have excellent insulating properties when of light weight with uniform densities and a high percentage of closed cells. However, there is difficulty in obtaining such uniformity and, where free expansion is permitted during the foaming of materials, this uniformity is diminished by the bread molding effect which causes the foamed mass to expand and shape itself like a loaf of bread and also by various skin effects.

It is an object of this invention to provide a method of and apparatus for continuously manufacturing cellular foam material which is light in weight and uniform in dimensions and in cellular structure.

It is another object of this invention to provide a method of and apparatus for continuously manufacturing cellular foam material in which the rise by the foaming reaction is made substantially uniform throughout.

It is another object of this invention to provide a method of and apparatus for continuously manufacturing cellular foam material in which microwaves are applied to the foam-forming material and distributed in such a way that the rise is made substantially uniform throughout.

These and other objects are attained in the form shown in the drawings in which an endless belt either with or without a covering sheet is fed continuously or intermittently beneath a foam-mixing apparatus and a trowel and a mircowave generating apparatus in succession to distribute, react and cure the materials to produce the foam material in a substantially flat, continuous slab which, if desired, is cut into pieces of the desired length. The belt is preferably made of non-adherent material, such as polyethylene, while the sheet material may be either of adherent or non-adherent material.

Further objects and advantages of the present invention will be apparent from the following description, reference being had to the accompanying drawings wherein a preferred embodiment of the present invention is clearly shown.

In the drawing:

FIGURE 1 is a side elevational view of an apparatus for carrying out my improved method;

FIGURE 2 is a left-end view of the apparatus taken as indicated by the arrow 2 in FIGURE 1;

FIGURE 3 is a transverse sectional view taken along the line 3—3 of FIGURE 1; and FIGURE 4 is a transverse sectional view taken substantially along the line 4—4 of FIGURE 1.

Referring now to the drawings, there is shown an endless belt 20 supported on end rolls 22 and 24 which are rotatably mouned in the frame 26. In between the end rolls, the endless belt 20 is supported by a series of small rolls 28 and by a flat table 30 or other support of plastic which can be penetrated by microwaves. The endless belt 20 is preferably made of a material which is not adherent to the foam material to be manufactured. For example, if polyurethane foam is to be manufactured, the belt 20 may be made of polyethylene which is non-adherent to the polyurethane. The belt 20 is preferably driven continuously by the electric motor 32. However, if desired, the belt 20 may be driven intermittently by the motor 32. If desired, the foam-forming materials may be deposited directly on the belt which then serves as a mold for the foam material. However, as shown in FIGURE 1, it is often more practical to feed a sheet material 34 from a roll 36 onto the belt 20 so that it is carried by the belt from one end of its upper surface to the opposite end. The end rolls 22 and 24 are provided with wide flanges so that the edges of the sheet 34 are turned up at the sides so as to provide adequate confinement for the foam material on both sides. When it is desired that the sheet material 34 adhere to the foam-forming materials, the sheet may be of either paper or vinyl sheeting or some type of fabric. If it is desired that the sheet 34 not adhere to the foam-forming material, then this sheet should be of polyethylene. In addition to the flanges on the belt roller 22, there may be provided angle rollers 38 for assuring that the sheet material is held at the base of the flanges of the roller 22. This assures proper shaping of the sheet material 34 prior to the deposit of the foam-forming materials thereon.

Above the belt 20, there is provided a foam-mixing apparatus 40 in which the A component is circulated to and from the valves of the apparatus through the pipes 42 and 44 and the B component is circulated to and from the apparatus through the pipes 46 and 48. Dual three-way valves 50 and 52 are provided which are simultaneously operated by a single handle 54 to deliver both components to the mixer in the proper proportions simultaneously. The outlet 56 of the mixer 40 delivers the mixed foam-forming materials 58 to the sheet material 34 directly beneath. The sheet material 34 supports and carries the foam-forming materials 58 to the right upon its upper surfaces between its upturned side edges. A trowel 60, which is adjustable vertically by the manually operable screw 62, extends transversely over the foam-forming materials for spreading the foam-forming materials laterally at the proper depth to assure the desired thickness of the final product.

In the past, the formation of a skin at the edges of the foam-forming material caused a reduction in the expansion of the material at the edges and increased expansion toward the center so that the top of the material would be shaped like that of a loaf of bread upon the finish of its baking. According to my invention, after the trowel has spread the foam-forming material substantially uniformly upon the sheet material 34, I apply microwave energy to the foam-forming material and distribute this energy in such a way that a substantially uniform rise of the foam-forming materials upon the sheet 34 is provided throughout. For this purpose, following the trowel 60, there is provided a microwave generating apparatus 64 having a coaxial cable 66 for conducting the microwave energy to the multitude of antennae 68. Suitable branch coaxial cables connect the cable 66 with the antennae 68. Above the antennae 68, there is provided a suitable sheet metal reflector 70 which reflects the microwaves downwardly onto the foam-forming materials 58 passing beneath the antennae 68 on the sheet material 34. These antennae 68 are located so as to apply the microwave energy to the foam-forming material in such a manner as to obtain a uniform rise in the foam-forming material as a result of the application of the microwave energy and the foaming reaction throughout the sheet material 34.

To prevent reflected microwaves from causing non-uniform temperatures throughout the foam and, particularly, to prevent the bottom of the foam-forming materials from becoming hotter than the rest of the material, I support the belt 20 beneath the antennae 68 upon a table of a plastic material through which the microwaves readily pass. This table 30 also forms the top of a microwave absorber including a sheet metal container 72 containing a cooling liquid 74, such as water, and a cooling coil 78 for cooling the liquid 74. This cooling coil 78 may either be cooled by circulating cold water or by being made the evaporator of a refrigerating system. The plastic table 30 and the cold water 74 within the container 72 cooled by the coil 78 assures the absorption of any microwave energy passing through the foam-forming material 58, the sheet material 34 and the belt 20. This assures the substantially uniform rise in the foam materials over substantially the entire horizontal surface of the sheet material 34.

Following the treatment of the foam-forming material with microwaves, the material may be cut into pieces 80 of any suitable length or desired length by the use of a flying cutter or a flying saw 82 represened diagrammatically. Various forms of foam-forming materials may be used as desired, for example, flexible foams, semi-rigid or rigid foams may be produced by suitable materials. These foams may be blown with various gases, such as trifluoromonochloromethane or carbon dioxide.

As one specific example of a suitable foam, such as a polyether urethane foam, the supply conduit 42 is charged with the A component which is composed of a mixture of 100 parts of prepolymer F to 20 parts of Freon 11, that is trifluoromonochloromethane, and supplied at a temperature of about 50° F. The supply conduit or pipe 46 is supplied with a mixture of 30 parts of polyether C to 29.5 parts of activator mixture A and kept at a temperature of about 110° F. All parts are determined by weight. The prepolymer F is composed of 75 parts of polyisocyanate ingredient A and 25 parts of polyether C. The isocyanate ingredient A is composed of 80 parts of 2,4 diisocyanate and 20 parts of 2,6 isocyanate. The polyether C contains 1 mol of sorbitol and 10 mols of propylene oxide. It has an OH number of 495, an acid number of .30, and a viscosity (CPS) at 83° F. of 7500. Water by weight is .1 mol. The activator mixture I, expressed in parts by weight, includes 26 parts of N,N,N′,N′, tetrakis (2-hydroxypropyl) ethylene diamine, 3 parts triethylene diamine, and .5 part emulsifier made up of 90% propylene glycol and 10% polyethylene glycol. As an alternative, the polyether C may contain 1 mol of sorbitol and 2 mols of propylene oxide. This second alternative form has an OH number of 495, an acid number of .30 and a viscosity (CPS) at 83° F. of 7500. Water by weight is .1 mol.

Other foam-forming materials which may be used include unsaturated polyester resin provided with a fluorohydrocarbon, surfactant and catalyst; vinyl foam-forming resins or materials, such as polyvinyl chloride resin with a blowing agent, stabilizer and plasticizer; and epoxy resin foam-forming materials such as are disclosed in United States Patent 3,051,661, issued August 28, 1962.

The microwave generator 64 may, for example, supply or discharge microwaves at 2450 megacycles frequency from the antennae 68. However, microwave generators having a different frequency and a different available intensity may be used continuously to obtain the exact results desired. By microwaves and microwave energy, I mean electromagnetic wave energy of about $10^7$ to $10^{13}$ cycles per second.

While the embodiment of the present invention, as herein disclosed, constitutes a preferred form, it is to be understood that other forms might be adopted.

What is claimed is as follows:

1. The method of making cellular foam material which includes depositing foam forming materials onto a moving sheet, continuing the movement of the sheet after the foam-forming materials have been deposited thereon, directing microwave energy into the foam-forming materials as they move with the sheet to substantially improve and make more uniform the forming of the cellular foam, and absorbing any microwave energy emerging from the foam.

2. The method of making cellular foam material which includes depositing foam-forming materials onto the top of a moving sheet, continuing the movement of the sheet after the foam-forming materials have been deposited thereon, emitting microwave energy above said materials and directing said energy downwardly into the foam-forming materials as they move with the sheet to substantially improve and make more uniform the form of the cellular foam, and beneath the sheet absorbing any microwave energy emerging from the bottom of the sheet.

References Cited by the Examiner
UNITED STATES PATENTS

| | | | |
|---|---|---|---|
| 2,504,754 | 4/50 | Sweeney | 156—272 X |
| 2,586,275 | 2/52 | Toulmin | 156—78 X |
| 2,603,741 | 7/52 | Siefried et al. | 219—10.55 |
| 2,738,406 | 3/56 | Zaleski | 219—10.55 |
| 2,866,730 | 12/58 | Potchen et al. | 156—78 X |
| 2,956,310 | 10/60 | Roop et al. | 156—79 X |
| 2,962,407 | 11/60 | Aykanian | 156—78 X |
| 3,037,897 | 6/62 | Pelley | 156—78 |

FOREIGN PATENTS

| | | |
|---|---|---|
| 244,795 | 7/60 | Australia. |
| 910,090 | 11/62 | Great Britain. |

EARL M. BERGERT, *Primary Examiner.*